United States Patent
Hatanaka et al.

(10) Patent No.: US 7,824,535 B2
(45) Date of Patent: Nov. 2, 2010

(54) MICROSTRUCTURE AND METHOD OF MANUFACTURING THE SAME

(75) Inventors: Yusuke Hatanaka, Shizuoka (JP); Tadabumi Tomita, Shizuoka (JP); Yoshinori Hotta, Aichi (JP); Akio Uesugi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 332 days.

(21) Appl. No.: 11/699,447

(22) Filed: Jan. 30, 2007

(65) Prior Publication Data

US 2008/0057293 A1 Mar. 6, 2008

(30) Foreign Application Priority Data

Feb. 23, 2006 (JP) .............................. 2006-046985

(51) Int. Cl.
*C25D 11/06* (2006.01)
*B32B 3/26* (2006.01)

(52) U.S. Cl. ...................... 205/324; 205/221; 205/172; 205/175; 428/304.4

(58) Field of Classification Search ....................... None
See application file for complete search history.

(56) References Cited

U.S. PATENT DOCUMENTS 6,838,297 B2   1/2005   Iwasaki et al.

FOREIGN PATENT DOCUMENTS

| JP | 2794427 | B2 | 6/1998 |
|---|---|---|---|
| JP | 2000-31462 | A | 1/2000 |
| JP | 3154638 | B2 | 2/2001 |

OTHER PUBLICATIONS

Hideki Masuda, et al. "Self-Ordering of Cell Configuration of Anodic Porous Alumina with Large-Size Pores in Phosphoric Acid Solution", Jpn. J. Appl. Phys., Nov. 1, 1998, pp. L1340-L1342, vol. 37, Part 2, No. 11A.

Hideki Masuda, "Highly ordered metal nanohole array based on anodized alumina", Kotai Butsuri, Solid State Physics, 1996, pp. 493-499, vol. 31, No. 5 and its partial English Translation.

*Primary Examiner*—Ling Xu
(74) *Attorney, Agent, or Firm*—Sughrue Mion, PLLC (57) ABSTRACT

A microstructure includes an anodized aluminum layer that has on a surface thereof micropores, at least some of which contain a catalyst, in a micropore array with a degree of ordering of at least 40%. A method of manufacturing the microstructure includes anodizing an aluminum member to form on its surface an anodized layer having micropores, removing the aluminum member, and supporting a catalyst on at least part of the anodized layer. The microstructure is excellent in heat resistance.

4 Claims, 2 Drawing Sheets

MICROSTRUCTURE AND METHOD OF MANUFACTURING THE SAME

The entire contents of all documents cited in this specification are incorporated herein by reference.

BACKGROUND OF THE INVENTION

The present invention relates to a microstructure having a catalyst supported in micropores and a method of manufacturing the same.

In the technical field of metal and semiconductor thin films, wires and dots, it is known that the movement of free electrons becomes confined at sizes smaller than some characteristic length, as a result of which singular electrical, optical and chemical phenomena become observable. Such phenomena are called "quantum mechanical size effects" or simply "quantum size effects." Functional materials which employ such singular phenomena are under active research and development. Specifically, materials having structures smaller than several hundred nanometers in size, typically called microstructures or nanostructures, are the subject of current efforts in material development.

Methods for manufacturing such microstructures include processes in which a nanostructure is directly manufactured by semiconductor fabrication technology, including micropatterning technology such as photolithography, electron beam lithography, or x-ray lithography.

Of particular note is the considerable amount of research being conducted today on processes for manufacturing nanostructures having an ordered microstructure.

One method of forming an ordered structure in a self-regulating manner is illustrated by an anodized alumina layer (anodized layer) obtained by subjecting aluminum to anodizing treatment in an electrolytic solution. It is known that a plurality of micropores having diameters of about several nanometers to about several hundreds of nanometers are formed in a regular arrangement within the anodized layer. It is also known that when a completely ordered arrangement is obtained by the self-ordering treatment of this anodized layer, hexagonal columnar cells will be theoretically formed, each cell having a base in the shape of a regular hexagon centered on a micropore, and that the lines connecting neighboring micropores will form equilateral triangles.

For example, H. Masuda et al. (Jpn. J. Appl. Phys., Vol. 37, Part 2, No. 11A, pp. L1340-1342 (Nov. 1, 1998), FIG. 2) describes an anodized layer having micropores. In another related publication (Hyomen Gijutsu Binran [Handbook of Surface Technology], edited by The Surface Finishing Society of Japan (Nikkan Kogyo Shimbun Co., Ltd., 1998), pp. 490-553), it is described that micropores are naturally formed in an anodized layer as oxidation proceeds. Moreover, H. Masuda ("Highly ordered metal nanohole array based on anodized alumina", Kotai Butsuri (Solid State Physics), Vol. 31, No. 5, pp. 493-499 (1996)) has proposed the formation of a gold dot array on a silicon substrate using a porous anodized layer as the mask.

A plurality of micropores take on a honeycomb-like structure in which the pores are formed parallel in a direction substantially vertical to the substrate surface, and at substantially equal intervals. This point is deemed to be the most distinctive characteristic of anodized layers in terms of material. Another remarkable feature of anodized layers, thought to be absent in other materials, is the ability to relatively freely control the pore diameter, pore spacing and pore depth (see Masuda, 1996).

Known examples of applications for anodized layers include various types of devices, such as nanodevices for supporting catalysts, optical functional devices, magnetic devices, and luminescent devices. For example, JP 2000-31462 A mentions a number of applications, including magnetic devices in which the micropores are filled with the magnetic metal cobalt or nickel, luminescent devices in which the micropores are filled with the luminescent material ZnO, and biosensors in which the micropores are filled with enzymes/antibodies.

SUMMARY OF THE INVENTION

However, the above-mentioned devices have required techniques for manufacturing materials having higher heat resistance because aluminum that is a main component of members in the devices has a relatively low melting point of 660° C.

It is therefore an object of the invention to provide catalyst-supporting, highly heat-resistant microstructures. Another object of the invention is to provide a method of manufacturing such microstructures.

The inventors have found that a highly heat-resistant microstructure composed of a catalyst-supporting oxide film can be obtained by anodizing an aluminum member, then removing the aluminum member to obtain an anodized film, and supporting a catalyst on the film. The invention has been completed on the basis of the finding.

Accordingly, the invention provides the following (1) to (5).

(1) A microstructure comprising an anodized aluminum layer having on a surface thereof micropores, at least some of which contain a catalyst, in a micropore array with a degree of ordering of at least 40%.

(2) A method of manufacturing a microstructure composed of an anodized layer having on a surface thereof catalyst-supporting micropores, comprising the steps of anodizing an aluminum member to form on its surface an anodized layer having micropores on a surface thereof, removing the aluminum member, and supporting a catalyst on at least part of the anodized layer.

(3) The method of manufacturing the microstructure according to (2) above, wherein a degree of ordering of the micropores is at least 40%.

(4) A microstructure obtained by the manufacturing method according to (2) above.

(5) A microstructure comprising a heat-resistant support, and an aluminum surface layer which has an aluminum purity of at least 99.7 wt % and a thickness of less than 30 μm and which is formed on the heat-resistant support, wherein the aluminum surface layer has micropores obtained by anodizing treatment in an array with a degree of ordering of at least 40%, and contains a catalyst in at least some of the micropores.

Because the highly heat-resistant microstructure of the invention does not undergo deformation or failure due to heat, it is useful in reactions involving exposure of the microstructure as a catalyst to an elevated temperature for an extended period of time.

DETAILED DESCRIPTION OF THE INVENTION

The invention is described more fully below.

<Microstructures of the Invention>

The microstructure according to a first aspect of the invention is a microstructure comprising an anodized aluminum layer having micropores, at least some of which contain a catalyst, in an array with a degree of ordering of at least 40%.

Because the microstructure according to the first aspect of the invention is made of an anodized aluminum layer, it has a high heat resistance. Moreover, the high degree of ordering of the micropore array provides the microstructure with a high catalytic activity. The inventive microstructure may be manufactured by, for example, anodizing an aluminum member, then supporting a catalyst thereon and subsequently removing the aluminum member so as to leave only the catalyst-supporting anodized aluminum layer, or alternatively anodizing an aluminum member to form an anodized layer, then removing the aluminum member and subsequently supporting a catalyst thereon. However, no particular limitation is imposed on the method of manufacture. The aluminum member may be made of aluminum alone, or may be composed of a relatively low-purity aluminum material (support) having thereon a high-purity aluminum surface layer. The micropore array has a degree of ordering of preferably at least 60%, more preferably at least 70%, even more preferably at least 80%, and most preferably at least 90%. The reason is that a higher degree of ordering provides a higher catalytic activity.

The microstructure according to a second aspect of the invention is a microstructure comprising a heat-resistant support, and an aluminum surface layer having an aluminum purity of at least 99.7 wt % and a thickness of less than 30 µm and formed on the support, wherein the aluminum surface layer has micropores obtained by anodizing treatment in an array with a degree of ordering of at least 40%, and contains a catalyst in at least some of the micropores.

<Substrate>

Figure 2A:
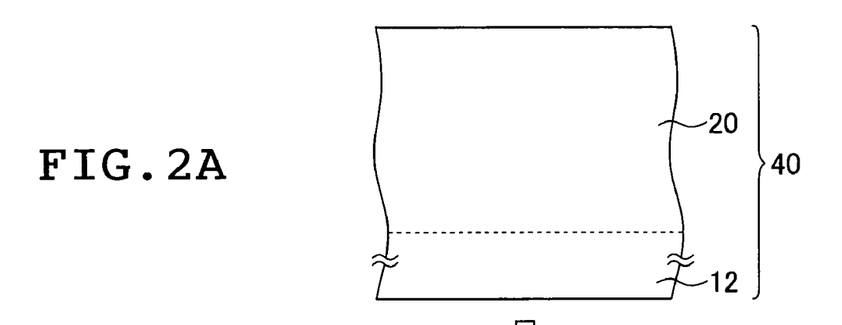
FIGS. 2A to 2D show schematic diagrams illustrating the inventive method of manufacturing microstructures.

The starting material for manufacturing the microstructure of the invention is a substrate. As shown in FIG. 2A, a substrate 40 includes a surface layer 20 made of an aluminum member to be described later, and a support 12 which is provided therebelow. In the substrate used in the first aspect of the invention, the support 12 and the surface layer 20 may be made of the same aluminum member, or the support 12 may be a relatively low-purity aluminum member having a high-purity aluminum surface layer 20 thereon.

The microstructure according to the second aspect of the invention includes a heat-resistant support and an aluminum surface layer which has a thickness of less than 30 µm and is formed on the heat-resistant support. As used herein, "heat-resistant support" refers to a substrate made of a material having a melting point that exceeds the melting point of aluminum (660° C.). Although no limitation is imposed on the shape, a substrate in the form of a plate is preferred, and a material having a melting point of 1,000° C. or above is preferred. Suitable examples of pure metals include cobalt, chromium, iron, copper, lithium, manganese, molybdenum, niobium, nickel, silicon, tantalum, titanium, tungsten and zirconium. Illustrative examples of known alloys obtained by suitably mixing and melting together any of the above metals include cast irons, carbon steels, low-alloy steels, stainless steels, nickel steels, chromium-molybdenum steels, heat-resistant alloys (INCONEL®, HASTELLOY®, NIMONIC®), copper alloys, nickel alloys and titanium alloys.

Additionally, within the stainless steels, there are not only the categories of nonmagnetic austenitic stainless steels (common designation: SUS304) and magnetic ferrite stainless steels (common designation: SUS405), but also martensitic stainless steels, precipitation-hardened steels, chromium cast steels, chromium-nickel heat-resistant cast steels and nickel-chromium heat-resistant cast steels.

Moreover, inorganic oxide-based materials such as various types of ceramics, concretes and bricks, as well as quartz, soda glass, borosilicate glass (trade name: PYREX® 7740) and glass ceramic (trade name: Corning 9606) are also known.

<Aluminum Member (Aluminum Surface Layer)>

The aluminum member used in the method of manufacturing the microstructure according to the first aspect of the invention is obtained by subjecting one surface of an aluminum member to anodizing treatment so as to provide on that surface an anodized layer containing micropores. The aluminum member to be subjected to anodizing treatment, while not subject to any particular limitation, may be an aluminum member known in the prior art. Examples include pure aluminum plate, alloy plates composed primarily of aluminum and containing trace amounts of other elements, and low-purity aluminum (e.g., recycled material).

The aluminum member has an aluminum purity of preferably at least 99.5 wt %, more preferably at least 99.9 wt %, and even more preferably at least 99.99 wt %. At an aluminum purity in the above range, the array of pores will be sufficiently well-ordered.

The aluminum member in the first aspect of the invention may be composed entirely of an aluminum member. However, because the aluminum member other than the anodized layer is removed from the finished product, it may be composed of a relatively low-purity aluminum material as the support 12 having a relatively high-purity aluminum surface layer 20 formed thereon by a process such as vacuum deposition or sputtering.

The aluminum member in the second aspect of the invention includes a heat-resistant support and an aluminum surface layer which has an aluminum purity of at least 99.7 wt % and a thickness of less than 30 µm and which is formed on the heat-resistant support. Illustrative examples include members obtained by the vapor deposition of high-purity aluminum onto glass, silicon or the like.

The aluminum member is preferably one that has been subjected beforehand to degreasing treatment and mirror-like finishing treatment. If the microstructure of the invention is to be used in applications that make use of its optical transparency, it is preferable to perform heat treatment beforehand. Heat treatment will enlarge the region where the array of pores is highly ordered.

<Heat Treatment>

Heat treatment is preferably carried out at a temperature of from 200 to 350° C. for a period of about 30 seconds to about 2 minutes. The orderliness of the array of micropores formed in the subsequently described anodizing treatment is enhanced in this way. Following heat treatment, it is advantageous to rapidly cool the aluminum member. The method of cooling is exemplified by a method involving direct immersion of the aluminum member in water or the like.

<Degreasing>

Degreasing is carried out with a suitable substance such as an acid, alkali or organic solvent so as to dissolve and remove organic substances, including dust, grease and resins, adhering to the aluminum surface, and thereby prevent defects due to organic substances from arising in each of the subsequent treatments.

Known degreasers may be used in degreasing treatment. For example, degreasing may be carried out using any of various commercially available degreasers by the prescribed method.

Preferred methods include the following: a method in which an organic solvent such as an alcohol (e.g., methanol), a ketone, benzine or a volatile oil is brought into contact with the aluminum surface at ambient temperature (organic solvent method); a method in which a liquid containing a surfactant such as soap or a neutral detergent is brought into contact with the aluminum surface at a temperature of from ambient temperature to 80° C., after which the surface is rinsed with water (surfactant method); a method in which an aqueous sulfuric acid solution having a concentration of 10 to 200 g/L is brought into contact with the aluminum surface at a temperature of from ambient temperature to 70° C. for a period of 30 to 80 seconds, following which the surface is rinsed with water; a method in which an aqueous solution of sodium hydroxide having a concentration of 5 to 20 g/L is brought into contact with the aluminum surface at ambient temperature for about 30 seconds while electrolysis is carried out by passing a direct current through the aluminum surface as the cathode at a current density of 1 to 10 A/dm$^2$, following which the surface is brought into contact with an aqueous solution of nitric acid having a concentration of 100 to 500 g/L and thereby neutralized; a method in which any of various known anodizing electrolytic solutions is brought into contact with the aluminum surface at ambient temperature while electrolysis is carried out by passing a direct current at a current density of 1 to 10 A/dm$^2$ or an alternating current through the aluminum surface as the cathode; a method in which an aqueous alkali solution having a concentration of 10 to 200 g/L is brought into contact with the aluminum surface at 40 to 50° C. for 15 to 60 seconds, following which the surface is brought into contact with an aqueous nitric acid solution having a concentration of 100 to 500 g/L and thereby neutralized; a method in which an emulsion prepared by mixing a surfactant, water or the like into an oil such as gas oil or kerosene is brought into contact with the aluminum surface at a temperature of from ambient temperature to 50° C., following which the surface is rinsed with water (emulsion degreasing method); and a method in which a mixed solution of, for example, sodium carbonate, a phosphate and a surfactant is brought into contact with the aluminum surface at a temperature of from ambient temperature to 50° C. for 30 to 180 seconds, following which the surface is rinsed with water (phosphate method).

The method used for degreasing is preferably one which can remove grease from the aluminum surface but causes substantially no aluminum dissolution. Hence, an organic solvent method, surfactant method, emulsion degreasing method or phosphate method is preferred.

<Other Chemical Pretreatment>

Various methods described for chemical pretreatment in Aruminiumu Gijutsu Binran [Handbook of Aluminum Technology] (edited by the Light Metal Association (Kallos Publishing Co., 1996), pp. 926-929) may be used. These methods enable factors that may cause defects in micropores to be formed later to be removed and have an effect of enhancing the orderliness of the arrangement of micropores. Of these, preferred examples include alkali degreasing, acid degreasing, electrolytic degreasing, and combinations thereof, which have a surface layer dissolving action; and alkali etching treatment, acid etching treatment, as well as combinations thereof, which have a strong surface layer dissolving action.

<Mirror-Like Finishing>

Mirror-like finishing is carried out to eliminate surface asperities on the aluminum member and improve the uniformity and reproducibility of grain-forming treatment by a process such as electrodeposition. Examples of surface asperities on the aluminum member include rolling streaks formed during rolling when the aluminum member has been produced by a process including rolling.

In the practice of the invention, mirror-like finishing is not subject to any particular limitation, and may be carried out using any suitable method known in the art. Examples of suitable methods include mechanical polishing, chemical polishing, and electrolytic polishing.

Illustrative examples of suitable mechanical polishing methods include polishing with various commercial abrasive cloths, and methods that combine the use of various commercial abrasives (e.g., diamond, alumina) with buffing. More specifically, a method which is carried out with an abrasive while changing over time the abrasive used from one having coarser particles to one having finer particles is appropriately illustrated. In such a case, the final abrasive used is preferably one having a grit size of 1500. In this way, a glossiness of at least 50% (in the case of rolled aluminum, at least 50% in both the rolling direction and the transverse direction) can be achieved.

Examples of chemical polishing methods include various methods mentioned in the 6$^{th}$ edition of Aluminum Handbook (Japan Aluminum Association, 2001), pp. 164-165.

Preferred examples include phosphoric acid/nitric acid method, Alupol I method, Alupol V method, Alcoa R5 method, $H_3PO_4$—$CH_3COOH$—Cu method and $H_3PO_4$—$HNO_3$—$CH_3COOH$ method. Of these, the phosphoric acid/nitric acid method, the $H_3PO_4$—$CH_3COOH$—Cu method and the $H_3PO_4$—$HNO_3$—$CH_3COOH$ method are especially preferred.

With chemical polishing, a glossiness of at least 70% (in the case of rolled aluminum, at least 70% in both the rolling direction and the transverse direction) can be achieved.

Examples of electrolytic polishing methods include various methods mentioned in the 6$^{th}$ edition of Aluminum Handbook (Japan Aluminum Association, 2001), pp. 164-165.

A preferred example is the method described in U.S. Pat. No. 2,708,655.

The method described in Jitsumu Hyomen Gijutsu (Practice of Surface Technology), Vol. 33, No. 3, pp. 32-38 (1986) is also preferred.

With electrolytic polishing, a glossiness of at least 70% (in the case of rolled aluminum, at least 70% in both the rolling direction and the transverse direction) can be achieved.

These methods may be suitably combined and used. In a preferred example, a method that uses an abrasive is carried out by changing over time the abrasive used from one having coarser particles to one having finer particles, following which electrolytic polishing is carried out.

Mirror-like finishing enables a surface having, for example, a mean surface roughness Ra of 0.1 µm or less and a glossiness of at least 50% to be obtained. The mean surface roughness Ra is preferably 0.03 µm or less, and more preferably 0.02 µm or less. The glossiness is preferably at least 70%, and more preferably at least 80%.

The glossiness is the specular reflectance which can be determined in accordance with JIS Z8741-1997 (Method 3: 60° Specular Gloss) in a direction perpendicular to the rolling direction. Specifically, measurement is carried out using a variable-angle glossmeter (e.g., VG-1D, manufactured by Nippon Denshoku Industries Co., Ltd.) at an angle of incidence/reflection of 60° when the specular reflectance is 70% or less, and at an angle of incidence/reflection of 20° when the specular reflectance is more than 70%.

<First Anodizing Treatment>

Prior to anodizing treatment in which micropores are formed on the aluminum member (referred to below as a "second anodizing treatment"), it is preferable in the invention to form pits that will serve as the starting points for the formation of micropores. The method that may be used to form pits is anodizing treatment which makes use of self-ordering nature in the anodized layer. This treatment is referred to below as a "first anodizing treatment".

The first anodizing treatment in the invention is a method which enhances the orderliness by using the regularly arranging nature of micropores in the anodized layer as described above and eliminating factors that may disturb an orderly arrangement. Specifically, an anodized layer is formed on high-purity aluminum at a voltage appropriate for the type of electrolytic solution and at a low speed over an extended period of time (e.g., from several hours to well over ten hours), following which film removal treatment is carried out.

In this method, because the pore diameter is dependent on the voltage, the desired pore diameter can be obtained to a certain degree by controlling the voltage.

The average flow rate in the first anodizing treatment is preferably 0.5 to 20.0 m/min. Uniformity and high orderliness can be achieved by performing anodizing treatment at a flow rate within the above range. The average flow rate is more preferably 1.0 to 15.0 m/min and even more preferably 2.0 to 10.0 m/min.

The method of flowing the electrolytic solution under the condition described above is not subject to any particular limitation, and a method which uses a general stirring device such as a stirrer may be employed. Moreover, use of a stirrer capable of controlling the stirring speed in the digital display mode is preferable because the average flow rate can be controlled. An example of such stirring device includes a magnetic stirrer HS-50D (produced by As One Corporation).

Anodizing treatment used in this invention may be carried out by, for example, a method that involves passing an electrical current through the aluminum member as the anode in a solution having an acid concentration of 1 to 10 wt %. Solutions that may be used in anodizing treatment are preferably acid solutions. It is preferable to use sulfuric acid, phosphoric acid, chromic acid, oxalic acid, sulfamic acid, benzenesulfonic acid and amidosulfonic acid, and more preferably sulfuric acid, phosphoric acid and oxalic acid. These acids may be used singly or in combination of two or more.

The conditions of the first anodizing treatment vary depending on the electrolytic solution used, and thus cannot be strictly specified. However, it is generally preferable for the electrolyte concentration to be 0.1 to 20 wt %, the temperature of the solution to be −10 to 30° C., the current density to be 0.01 to 20 A/dm$^2$, the voltage to be 3 to 300 V, and the period of electrolysis to be 0.5 to 30 hours. It is more preferable for the electrolyte concentration to be 0.5 to 15 wt %, the temperature of the solution to be −5 to 25° C., the current density to be 0.05 to 15 A/dm$^2$, the voltage to be 5 to 250 V, and the period of electrolysis to be 1 to 25 hours. It is particularly preferable for the electrolyte concentration to be 1 to 10 wt %, the temperature of the solution to be 0 to 20° C., the current density to be 0.1 to 10 A/dm$^2$, the voltage to be 10 to 200 V, and the period of electrolysis to be 2 to 20 hours.

The anodized layer formed has a thickness of preferably 1 to 300 μm, more preferably 5 to 150 μm and even more preferably 10 to 100 μm.

In the practice of the invention, the first anodizing treatment is carried out for a period of preferably 1 to 16 hours, more preferably 2 to 12 hours, and even more preferably 2 to 7 hours.

Film removal treatment is carried out for a period of preferably 0.5 to 10 hours, more preferably 2 to 10 hours, and even more preferably 4 to 10 hours.

<Film Removal Treatment>

Film removal treatment is carried out in which the anodized layer formed by the first anodizing treatment is dissolved and removed in accordance with the intended application. Such treatment is carried out for preferably at least 3 hours, more preferably at least 7 hours, and most preferably at least 10 hours, using a mixed aqueous solution of chromic acid and phosphoric acid at about 50° C. Carrying out treatment using a boiling aqueous solution destroys or disrupts the starting points for self-ordering. Hence, the aqueous solution is used without being boiled.

The orderliness of the anodized layer formed increases as the underlying aluminum is approached in the depth direction. Hence, once film removal has taken place, the lower portion of the anodized layer remaining on the underlying aluminum emerges at the surface, affording an orderly array of pits. Therefore, although film removal is not subject to any particular limitation so long as only the anodized layer made of aluminum oxide is dissolved without dissolution of the underlying aluminum, the use of an aqueous solution containing one or more compounds selected from the following group is preferred:

(B-1) nitric acid, chromic anhydride, chromium hydroxide;
(B-2) zirconium phosphate compound, titanium phosphate compound;
(B-3) lithium salt compound, cerium salt compound, magnesium salt compound, sodium hexafluorosilicate;
(B-4) zinc fluoride, manganese, molybdenum, magnesium, halogen compounds.

A mixed aqueous solution of phosphoric acid and nitric acid or a mixed aqueous solution of phosphoric acid and chromic anhydride is more preferred.

The concentration of acids included in these aqueous solutions is preferably from 0.01 to 10 mol/L, more preferably from 0.05 to 5 mol/L, and even more preferably from 0.1 to 1 mol/L.

The treatment temperature is preferably at least 0° C., more preferably at least 20° C., and even more preferably at least 40° C. The treatment time is preferably at least 30 minutes, more preferably at least 1 hour, and most preferably at least 3 hours. Carrying out treatment using a boiling aqueous solution destroys or disrupts the starting points for self-ordering. Hence, the aqueous solution is used without being boiled.

<Second Anodizing Treatment>

Figure 2B:
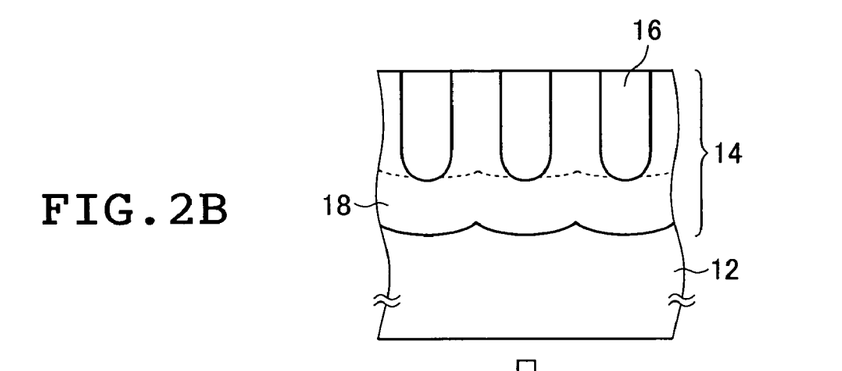
Figure 2C:
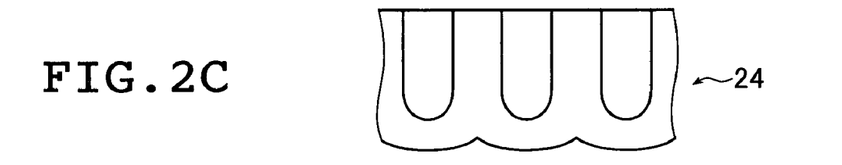
Figure 2D:
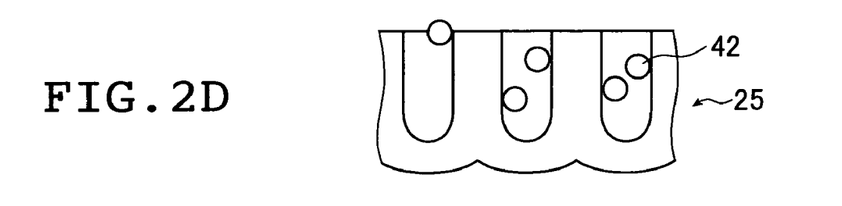

In the practice of the invention, an anodized layer may be formed by a second anodizing treatment after pits have been formed on the aluminum surface depending on the intended application as described above. FIG. 2B is a cross-sectional view showing an anodized layer 14 obtained by the first anodizing treatment, micropores 16, and a barrier layer 18 which have been formed on the aluminum member serving as the support 12. FIG. 2C is a schematic cross-sectional view showing an anodized layer 24 having micropores following dissolution and removal of the aluminum member 12, and FIG. 2D shows a microstructure 25 according to the first aspect of the invention which supports a catalyst 42.

The second anodizing treatment may be carried out using a method known in the art, although it is preferably carried out under the same conditions as the above-described self-ordering method.

Suitable use can also be made of a method in which the current is repeatedly turned on and off in an intermittent manner while keeping the dc voltage constant, and a method in which the current is repeatedly turned on and off while intermittently changing the dc voltage. Because these methods enables formation of micropores in the anodized layer, they are preferable for improving uniformity, particularly when sealing is carried out by electrodeposition.

In the above method where the voltage is intermittently changed, it is preferable to gradually reduce the voltage. It is possible in this way to lower the resistance in the anodized layer, enabling uniformity to be achieved when electrodeposition is subsequently carried out.

The anodizing treatment conditions vary depending on the electrolytic solution used, and thus cannot be strictly specified. However, the following conditions are generally preferred: an electrolyte concentration of from 0.01 to 10 mol/L, a solution temperature of from 0 to 20° C., a current density of from 0.1 to 10 A/dm$^2$, a voltage of from 15 to 240 V, an amount of electricity of from 3 to 10,000 C/dm$^2$, and an electrolysis time of from 30 to 1,000 minutes.

When the second anodizing treatment is carried out at a low temperature (from −20 to −5° C.), the array of micropores is well-ordered and the pore diameter is uniform.

In the practice of the invention, by carrying out the second anodizing treatment at a relatively high temperature (25 to 70° C.), it is easy to disrupt the micropore array and to set the variation in pore diameter within a given range. The variation in pore diameter can also be controlled by means of the treatment time.

The thickness of the layer obtained by the second anodizing treatment is set to preferably at least $10^2$ times, more preferably at least $10^5$ times, and most preferably at least $10^7$ times, the pore diameter. To this end, the second anodizing treatment is preferably performed for a period of at least 5 hours, more preferably at least 50 hours, and even more preferably at least 300 hours.

The average pore density is preferably from 50 to 1,500 pores/μm$^2$.

The area ratio occupied by the micropores is preferably from 20 to 50%.

The area ratio occupied by the micropores is the proportion of the sum of the areas of the individual micropore openings to the area of the aluminum surface. More specifically, the surface porosity is determined by measurement under conditions where no catalyst or the like is supported in the micropores.

<Pore Widening Treatment>

Pore widening treatment, which is carried out after anodizing treatment, is performed by immersing the aluminum member in an aqueous solution of an acid or an alkali so as to dissolve the anodized layer and enlarge the diameter of the micropores.

The regularity of the micropore array and variation of the pore diameter can be thus easily controlled.

When pore widening treatment is to be carried out with an aqueous acid solution, it is preferable to use an aqueous solution of an inorganic acid such as sulfuric acid, phosphoric acid, nitric acid or hydrochloric acid, or a mixture thereof. It is desirable for the aqueous acid solution to have a concentration of 1 to 10 wt % and a temperature of 25 to 40° C.

When pore widening treatment is to be carried out with an aqueous alkali solution, it is preferable to use an aqueous solution of at least one alkali selected from the group consisting of sodium hydroxide, potassium hydroxide and lithium hydroxide. It is preferable for the aqueous alkali solution to have a concentration of 0.1 to 5 wt % and a temperature of 20 to 35° C.

Specific examples of preferred solutions include a 40° C. aqueous solution containing 50 g/L of phosphoric acid, a 30° C. aqueous solution containing 0.5 g/L of sodium hydroxide, and a 30° C. aqueous solution containing 0.5 g/L of potassium hydroxide.

The immersion time in the aqueous acid solution or aqueous alkali solution is preferably 8 to 60 minutes, more preferably 10 to 50 minutes, and even more preferably 15 to 30 minutes.

<Measurement of Degree of Ordering>

The degree of ordering, which is an indicator of the regularity of micropores, is determined based on the measurement on a surface image obtained by field emission scanning electron microscopy (FE-SEM) and is defined by the following formula (1).

$$\text{Degree of Ordering (\%)} = B/A \times 100 \tag{1}$$

In Formula (1), A represents the total number of micropores in a measurement region (1 to 5 μm$^2$); and B represents the number of specific micropores relative to the total number A of micropores in the measurement region for which, when a circle is drawn so as to be centered on the center of a specific micropore or the center of its corresponding equivalent circle and so as to be of the smallest radius that is internally tangent to the edge of another micropore, the circle includes the centers of six micropores other than the specific micropore.

Figure 1A:
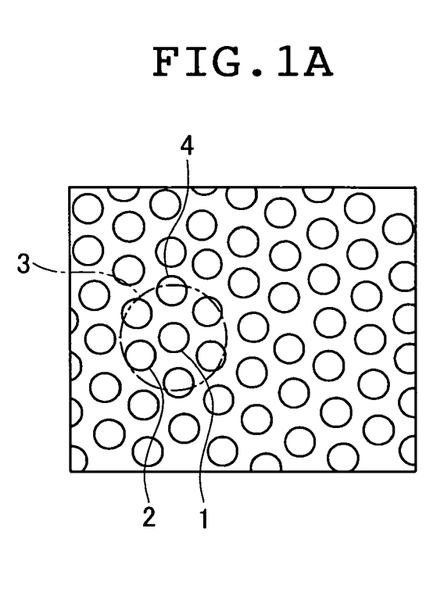
FIGS. 1A and 1B schematically show anodized layer surfaces for illustrating the degree of ordering of micropores.
Figure 1B:
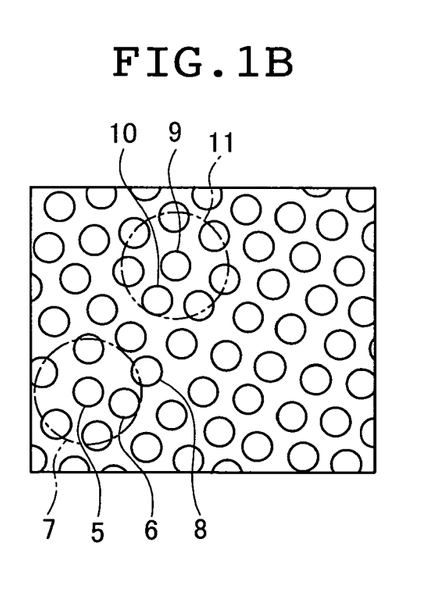

FIGS. 1A and 1B schematically show anodized layer surfaces for illustrating the degree of ordering of the micropores. The symbol B in Formula (1) is explained more fully below in conjunction with FIGS. 1A and 1B.

With regard to a micropore 1 shown in FIG. 1A, when a circle 3 is drawn so as to be centered on the center of the micropore 1 and so as to be of the smallest radius that is internally tangent to the edge of another micropore (inscribed in a micropore 2), the interior of the circle 3 includes the centers of six micropores other than the micropore 1. Therefore, the micropore 1 is counted for B. Although a micropore 4 is not completely included in the circle 3, the micropore 4 is counted as one of the micropores within the circle 3 because its center is within the circle 3.

On the other hand, with regard to a micropore 5 shown in FIG. 1B, when a circle 7 is drawn so as to be centered on the center of the micropore 5 and so as to be of the smallest radius that is internally tangent to the edge of another micropore (inscribed in a micropore 6), the interior of the circle 7 includes the centers of five micropores other than micropore 5. Therefore, micropore 5 is not counted for B. A micropore 8 is not counted as one of the micropores within the circle 7, because its center is outside the circle 7. With regard to a micropore 9 shown in FIG. 1B, when a circle 11 is drawn so as to be centered on the center of the micropore 9 and so as to be of the smallest radius that is internally tangent to the edge of another micropore (inscribed in a micropore 10), the interior of the circle 11 includes the centers of seven micropores other than the micropore 9. Therefore, the micropore 9 is not counted for B.

<Micropores>

The microstructure of the invention has an array of micropores with a degree of ordering of at least 40%, preferably at least 60%, more preferably at least 70%, even more preferably at least 80% and most preferably at least 90%. At a degree of ordering of at least 40%, the catalytic activity is enhanced. In the microstructure of the invention, micropores have preferably an average pore size of 25 to .35 nm and an average pore spacing of 50 to 120 nm. The term "pore spacing" as used herein refers to the distance between the centers of adjacent micropores and the term "average pore spacing" refers to the average value within the measurement field of view.

<Aluminum Member Removal Treatment>

The method of removing the aluminum member following anodizing treatment is not subject to any particular limitation, and it is preferable to use, for example, a method in which the aluminum member is immersed in a solvent in which the anodized layer is hardly soluble or insoluble but aluminum is soluble, at a temperature in a range of preferably 0° C. to 80° C., more preferably 10° C. to 60° C. and even more preferably 20 to 40° C. for a period of preferably at least 10 minutes, more preferably at least 30 minutes and even more preferably at least 1 hour, or such solvent is dropped onto the aluminum member. Preferred solvents that may be used include halogens (e.g., bromine and iodine); acidic solvents such as dilute sulfuric acid, phosphoric acid, oxalic acid, sulfamic acid, benzenesulfonic acid and amidosulfonic acid; and alkaline solvents such as sodium hydroxide, potassium hydroxide and calcium hydroxide. Bromine and iodine are particularly preferable. Stripping step to be described below may be used.

1) <Stripping Step>

The stripping step is an operation in which the anodized layer and the aluminum substrate are separated from each other by electrolysis in an aqueous acid solution using the above-described aluminum member as the cathode to give a structure composed of a micropore-bearing anodized layer. In the stripping step, electrolysis is carried out using the aluminum member as the cathode. Because this is the reverse of electrolysis in anodizing treatment using the aluminum member as the anode, it is referred to below as "reverse electrolysis."

In the stripping step, such reverse electrolysis generates hydrogen at the boundary between the anodized layer and the aluminum substrate in the aluminum member. The generated hydrogen reduces the barrier layer lying at the boundary between the anodized layer and the aluminum substrate to produce aluminum ions, which migrate into and are dissolved in an aqueous acid solution used as the electrolytic solution, causing the anodized layer and the aluminum substrate to separate at the boundary therebetween.

In reverse electrolysis, current is passed from the aluminum substrate side using the above-described aluminum member as the cathode. Anodes that may be used are not particularly limited. Illustrative examples include platinum-plated titanium electrodes, platinum electrodes, and carbon electrodes.

The aqueous acid solution used in reverse electrolysis has a pH of preferably 1 to 7, more preferably 2 to 6, and even more preferably 2.5 to 5.5. The aqueous acid solution has an electrical conductivity of preferably from 0.01 to 100 mS/cm, and more preferably from 0.1 to 50 mS/cm. When the aqueous acid solution has a pH and an electrical conductivity in the above ranges, good stripping is achieved without corrosion of the aluminum substrate or incomplete removal of the anodized layer.

If the electrical conductivity of the aqueous acid solution is too low, very small current values may not arise. In such a case, it is preferable to make the ionic concentration in the aqueous acid solution high so as to allow very small current values to arise. On the other hand, if the ionic concentration in the aqueous acid solution is too high, very small current values do arise, but electrolysis ends in a short time, after which the current value rises rapidly, making control difficult. Moreover, on exceeding the time in which a very small current value is reached, corrosion occurs.

Preferred examples of acids that may be used in the aqueous acid solution include oxalic acid, sulfuric acid and phosphoric acid. Alternatively, use can be made of, for example, metallic salt compounds which exhibit acidity when dissolved in water, and organic compounds which exhibit acidity when dissolved in water.

Illustrative examples of metallic salt compounds which exhibit acidity when dissolved in water include aluminum oxalate, aluminum sulfate, aluminum lactate, aluminum fluoride and aluminum borate.

Preferred organic compounds which exhibit acidity when dissolved in water are carboxylic acids. Suitable examples include saturated aliphatic dicarboxylic acids such as adipic acid, unsaturated aliphatic dicarboxylic acids such as maleic acid, aromatic monocarboxylic acids such as benzoic acid, aromatic dicarboxylic acids such as phthalic acid, and aromatic oxycarboxylic acids such as salicylic acid.

Alternatively, use can be made of salts which exhibit neutrality when dissolved in water, i.e., neutral salts. Suitable examples of neutral salts include carbonates such as ammonium carbonate and borates such as ammonium borate.

In cases where a neutral salt is used, one preferred embodiment is to prepare a mixed bath which also includes an additive such as a fluoride, a carbonic acid derivative or an acid amide. The fluoride is exemplified by ammonium fluoride. The carbonic acid derivative is exemplified by guanidine carbonate, urea and formaldehyde. The acid amide is exemplified by acetamide.

Of these, the use of oxalic acid, aluminum oxalate, sulfuric acid, aluminum sulfate or a mixture thereof is preferred. Aluminum sulfate and sulfuric acid are especially preferred from the standpoint of availability and wastewater treatability.

A preferred embodiment involves the use of an electrolytic solution of the same type as that used in the above-described anodizing treatment. In this way, reverse electrolysis and anodizing treatment can be carried out in the same electrolytic bath. Moreover, even when these are carried out in separate electrolytic baths, there are no adverse effects from the carryover of solution into the anodizing treatment bath.

The reverse electrolysis conditions vary depending on the electrolytic solution used, and thus cannot be strictly specified.

When the electrolytic solution is an aqueous solution of oxalic acid, the concentration is preferably from 0.4 to 10 wt %; when it is an aqueous solution of sulfuric acid, the concentration is preferably from 2 to 20 wt %; and when it is an aqueous solution of phosphoric acid, the concentration is preferably from 0.4 to 5 wt %.

The electrolytic solution generally has a temperature of from 0 to 50° C., and preferably from 10 to 35° C.

The current density is preferably from 0.1 to 200 A/dm$^2$, more preferably from 0.3 to 50 A/dm$^2$, and even more preferably from 0.5 to 10 A/dm$^2$. In the above range, stripping can be carried out more uniformly.

The voltage is preferably from 5 to 500 V and more preferably from 10 to 240 V. When anodizing treatment is followed by reverse electrolysis, constant voltage reverse electrolysis is preferably carried out at the same voltage as used in anodizing treatment.

A method in which current is repeatedly turned of and on in an intermittent manner while the dc voltage is kept constant, and a method in which current is repeatedly turned on and off while the dc voltage is intermittently changed may be advantageously used. In a preferred embodiment of the method that involves intermittently changing the voltage, the voltage is gradually reduced. The electrolysis time is preferably 1 to 500 seconds and more preferably 10 to 120 seconds.

The reverse electrolysis conditions within the above ranges provide more excellent strippability between the barrier layer of the anodized layer and the aluminum substrate and higher orderliness of pits in the anodized layer. A too large amount of electricity and a too long electrolysis time cause the boundary between the barrier layer of the anodized layer and the aluminum substrate to have a high temperature, whereby the resulting structure may be deformed to impair the orderliness of the pits.

It is preferable to finish reverse electrolysis by monitoring the current value and stopping electrolysis within about ±30% of the time at which the current reaches a minimal value, and more preferably by stopping electrolysis at a point of time when the current reaches the vicinity of a minimal value. In this case, the strippability and the surface properties of the anodized layer and aluminum substrate stripped from each other are excellent.

There will be times where the aluminum substrate obtained from the stripping step has remaining thereon a remnant of the anodized layer in a thickness of up to 0.2 µm over up to 10% of the stripped surface. To make use of such an aluminum substrate, it is desirable that it be free of any remnants of the anodized layer.

Accordingly, in such a case, it is preferable to remove remnants of the anodized layer by carrying out chemical treatment following reverse electrolysis. Specifically, removal can be effected by bringing any of various acidic or alkaline aqueous solutions into contact with the anodized layer.

Examples of acidic aqueous solutions include aqueous solutions of phosphoric acid, aqueous solutions of sulfuric acid, aqueous solutions of nitric acid, aqueous solutions of oxalic acid, and mixed aqueous solutions of chromic acid and phosphoric acid. Of these, mixed aqueous solutions of chromic acid and phosphoric acid are preferred.

The acidic aqueous solution has a pH of preferably −0.3 to 6, more preferably 0 to 4, and even more preferably 2 to 4. The temperature of the acidic aqueous solution is preferably from 20 to 60° C., and more preferably from 30 to 50° C.

The treatment time is preferably from 1 second to 6 hours, more preferably from 5 seconds to 3 hours, and even more preferably from 10 seconds to 1 hour.

Examples of alkaline aqueous solutions include aqueous solutions of sodium hydroxide, aqueous solutions of sodium carbonate and aqueous solutions of potassium hydroxide.

The alkaline aqueous solution has a pH of preferably 10 to 13.5, and more preferably 11 to 13. The temperature of the alkaline aqueous solution is preferably from 10 to 50° C., and more preferably from 20 to 40° C. The treatment time is preferably from 1 second to 10 minutes, more preferably from 2 seconds to 1 minute, and more preferably from 3 to 30 seconds.

Examples of preferred conditions for reverse electrolysis are given below.

<Preferred Conditions 1>

Cathode: Anodized layer obtained by anodization with aqueous solution of oxalic acid (concentration, 0.3 mol/L; temperature, 17° C.) at a voltage of 40 V for a treatment time of 60 minutes; layer thickness, 60 µm; pore diameter, 35 nm; coefficient of variation of the pore diameter, 15%; spacing of micropores, 63 nm.

Anode: Carbon electrode.

Electrolytic solution: Aqueous solution of aluminum sulfate having a concentration of 0.04 g/L (aluminum ion basis), a pH of 3.8, an electrical conductivity of 0.6 mS/cm, and a temperature of 33° C.

Voltage: 40 V (voltage setting).

Current density: 5 A/dm$^2$ (minimal value 1 A/dm$^2$)

Treatment time: at least 40 seconds.

The stripping step treatment time is very short compared with the time required in a film removal step involving dissolution with a mixed aqueous solution of chromic acid and phosphoric acid. Moreover, in a film removal step, when the aluminum oxide content (as $Al_2O_3$) of a mixed aqueous solution of chromic acid and phosphoric acid exceeds 15 g/L, the solvency abruptly deteriorates.

By contrast, in this stripping step, because the anodized layer is stripped off in a solid state at the boundary with the aluminum substrate, it can easily be separated off with a filter or the like. Hence, the aqueous acid solution used in reverse electrolysis does not deteriorate.

Therefore, the treatment time and the amount of aqueous acid solution consumed in the stripping step are respectively much shorter and much smaller than the treatment time and the amount of treatment solution consumed in a film removal step carried out with a mixed aqueous solution of chromic acid and phosphoric acid.

<Catalyst Supporting Treatment>

The microstructure of the invention has a catalyst supported in the micropores of the anodized layer.

The catalyst is not subject to any particular limitation as long as the catalyst used has a catalytic function, and examples of the catalyst that may be used include $AlCl_3$, $AlBr_3$, $Al_2O_3$, $SiO_2$, $SiO_2$—$Al_2O_3$, silicon zeolite, $SiO_2$—NiO, active carbon, $PbO/Al_2O_3$, $LaCoO_3$, $H_3PO_4$, $H_4P_2O_7$, $Bi_2O_3$—$MoO_3$, $Sb_2O_5$, $SbO_5$—$Fe_2O_3$, $SnO_2$—$Sb_2O_5$, Cu, $CuO_2$—$Cr_2O_3$, Cu—$Cr_2O_3$-ZnO, $Cu/SiO_2$, $CuCl_2$, Ag/α-$Al_2O_3$, Au, ZnO, ZnO—$Cr_2O_3$, $ZnCl_2$, ZnO—$Al_2O_3$—CaO, $TiO_2$, $TiCl_4.Al(C_2H_5)_3$, $Pt/TiO_2$, $V_2O_5$, $V_2O_5$—$P_2O_5$, $V_2O_5/TiO_2$, $Cr_2O_3$, $Cr_2O_3/Al_2O_3$, $MoO_3$, $MoO_3$-$SnO_2$, Co.Mo/$Al_2O_3$, $Ni.Mo/Al_2O_3$, $MOS_2$, Mo—Bi—O, $MoO_3$—$Fe_2O_3$, $H_3PMo_{12}O_{40}$, $WO_3$, $H_3PW_{12}O_{40}$, $MnO_2$, Fe—$K_2O$—$Al_2O_3$, $Fe_2O_3$—$Cr_2O_3$, $Fe_2O_3$—$Cr_2O_3$—$K_2O$, $Fe_2O_3$, cobalt/active carbon, $Co_3O_4$, cobalt carbonyl complex, Ni, Raney nickel, nickel/support, modified nickel, Pt, $Pt/Al_2O_3$, Pt—Rh—Pd/support, Pd, $Pd/SiO_2$, $Pd/Al_2O_3$, $PdCl_2$—$CuCl_2$, Re, Re—Pt/$Al_2O_3$, $Re_2O_7/Al_2O_3$, Ru, $Ru/Al_2O_3$, Rh, and rhodium complex.

The method of supporting the catalyst is not particularly limited but any conventionally known technique may be used.

Examples of preferred techniques include electrodeposition, and a method which involves coating the aluminum member having the anodized layer with a dispersion of catalyst particles, then drying. The catalyst is preferably in the form of single particles or agglomerates.

An electrodeposition method known in the art may be used. For example, in the case of gold electrodeposition, use may be made of a process in which the aluminum member is immersed in a 30° C. dispersion containing 1 g/L of $HAuCl_4$ and 7 g/L of $H_2SO_4$ and electrodeposition is carried out at a constant voltage of 11 V (regulated with an autotransformer such as SLIDAC) for 5 to 6 minutes.

An example of the electrodeposition method which employs copper, tin and nickel is described in detail in Gendai Kagaku (Contemporary Chemistry), pp. 51-54 (January 1997)). Use can be made of this method as well.

The dispersions employed in methods which use catalyst particles can be obtained by a conventionally known method. Illustrative examples include methods of preparing fine particles by low-vacuum vapor deposition and methods of preparing catalyst colloids by reducing an aqueous solution of a catalyst salt.

The catalyst colloidal particles have an average particle size of preferably 1 to 200 nm, more preferably 1 to 100 nm, and even more preferably 2 to 80 nm.

Preferred use can be made of water as the dispersion medium employed in the dispersion. Use can also be made of a mixed solvent composed of water and a solvent that is miscible with water, such as an alcohol, illustrative examples of which include ethyl alcohol, n-propyl alcohol, i-propyl alcohol, 1-butyl alcohol, 2-butyl alcohol, t-butyl alcohol, methyl cellosolve and butyl cellosolve.

No particular limitation is imposed on the technique used for coating the aluminum member with the dispersion of catalyst colloidal particles. Suitable examples of such techniques include bar coating, spin coating, spray coating, curtain coating, dip coating, air knife coating, blade coating and roll coating.

Preferred examples of dispersions that may be employed in methods which use catalyst colloidal particles include dispersions of gold colloidal particles and dispersions of silver colloidal particles.

Dispersions of gold colloidal particles that may be used include those described in JP 2001-89140 A and JP 11-80647 A. Use can also be made of commercial products.

Dispersions of silver colloidal particles preferably contain particles of silver-palladium alloys because these are not affected by the acids which leach out of the anodized layer. The palladium content in such a case is preferably from 5 to 30 wt %.

Application of the dispersion is followed by cleaning that may be appropriately performed using a solvent such as water. As a result of such cleaning, only the catalyst particles supported in the micropores remain in the anodized layer whereas catalyst particles that have not been supported in the micropores are removed.

The amount of supported catalyst is preferably 10 to 1,000 mg/m, more preferably 50 to 800 mg/m$^2$ and even more preferably 100 to 500 mg/m$^2$.

The surface porosity after catalyst supporting treatment is preferably not more than 70%, more preferably not more than 50% and even more preferably not more than 30%. The surface porosity after catalyst supporting treatment is defined as the sum of the areas of the openings in micropores having no catalyst supported therein relative to the area of the aluminum surface.

Catalyst colloidal particles which may be used in the dispersion generally have a dispersion in the particle size distribution, expressed as the coefficient of variation, of about 10 to 20%. In the practice of the invention, by setting the dispersion in pore size within a specific range, colloidal particles with dispersed particle size distribution can be efficiently used for sealing.

When the pore size is 50 nm or more, suitable use can be made of a method which employs catalyst colloidal particles. When the pore size is less than 50 nm, suitable use can be made of an electrodeposition process. Suitable use can also be made of a method which combines both approaches.

EXAMPLES

Examples are given below by way of illustration and should not be construed as limiting the invention.

Examples 1 to 30 and Comparative Examples 1 to 3

1. Manufacture of Microstructure (1) Fabrication of Substrate

The substrates used to manufacture the microstructures were fabricated as described below. These were cut and used so as to enable anodizing treatment to be carried out over an area of 10 cm square.

Substrate 1: High-purity aluminum. Produced by Wako Pure Chemical Industries, Ltd. Purity, 99.99 wt %; thickness, 0.4 mm.

Substrate 2: Aluminum JIS A1050 material provided with Surface Layer A. Produced by Nippon Light Metal Co., Ltd. Purity, 99.5 wt %; thickness, 0.24 mm.

Substrate 3: Aluminum JIS A1050 material provided with Surface Layer B. Produced by Nippon Light Metal Co., Ltd. Purity, 99.5 wt %; thickness, 0.24 mm.

Substrate 4: Aluminum JIS A1050 material. Produced by Nippon Light Metal Co., Ltd. Purity, 99.5 wt %; thickness, 0.30 mm.

Substrate 5: Aluminum JIS A1050 material provided with Surface Layer C. Produced by Nippon Light Metal Co., Ltd. Purity, 99.5 wt %; thickness, 0.30 mm.

Substrate 6: Aluminum JIS A1050 material provided with Surface Layer D. Produced by Nippon Light Metal Co., Ltd. Purity, 99.5 wt %; thickness, 0.30 mm.

Substrate 7: Aluminum vapor-deposited film. Torayfan AT80, produced by Toray Industries, Inc. Purity, 99.9 wt %; thickness, 0.02 mm.

Substrate 8: Aluminum XL untreated material provided with Surface Layer A. Produced by Sumitomo Light Metal Industries, Ltd. Purity, 99.3 wt %; thickness, 0.30 mm.

Substrate 9: Glass provided with Surface Layer E. Produced by As One Corporation. Purity, 99.9 wt %; thickness, 5 mm.

Substrate 10: Silicon wafer provided with Surface Layer E. Produced by Shin-Etsu Chemical Co., Ltd. Purity, >99.99 wt %.

Substrate 11: Synthetic quartz provided with Surface Layer E. VIOSIL-SG-2B, produced by Shin-Etsu Chemical Co., Ltd. Purity, >99.99 wt %; thickness, 0.6 mm.

Substrate 12: A copper-clad laminate provided with Surface Layer E (RAS33S42, produced by Shin-Etsu Chemical Co., Ltd.; purity, unknown; thickness, 0.08 mm), on the surface of which an aluminum-copper alloy film was formed by sputtering.

The above aluminum JIS A1050 material had a specular reflectance in the vertical direction of 40% (standard deviation, 10%), a specular reflectance in the horizontal direction of 15% (standard deviation, 10%), and a purity of 99.5 wt % (standard deviation, 0.1 wt %).

The above aluminum XL untreated material had a specular reflectance in the vertical direction of 85% (standard deviation, 5%), a specular reflectance in the horizontal direction of 83% (standard deviation, 5%), and a purity of 99.3 wt % (standard deviation, 0.1 wt %).

Surface Layers A to E were prepared as follows.

Surface Layer A was formed on the substrate by vacuum deposition under the following conditions: ultimate pressure, $4 \times 10^{-6}$ Pa; deposition current, 40 A; substrate heating to 150° C.; deposition material, aluminum wire having a purity of 99.9 wt % (The Nilaco Corporation). Surface Layer A had a thickness of 0.2 µm.

Surface Layer B was formed by the same method as Surface Layer A, except that aluminum wire having a purity of 99.99 wt % (The Nilaco Corporation) was used as the deposition material. Surface Layer B had a thickness of 0.2 µm.

Surface Layer C was formed on the substrate by sputtering under the following conditions: ultimate pressure, $4 \times 10^{-6}$ Pa; sputtering pressure, $10^{-2}$ Pa; argon flow rate, 20 sccm; substrate controlled to 150° C. (with cooling); no bias; sputtering power supply, RC; sputtering power, RF 400 W; sputtering material, 3N backing plate with a purity of 99.9 wt % (produced by Kyodo International, Inc.). Surface Layer C had a thickness of 0.5 µm.

Surface Layer D was formed by the same method as Surface Layer C, except for the use as the sputtering material of 4N backing plate with a purity of 99.99 wt % (Kyodo International, Inc.). Surface Layer D had a thickness of 0.5 µm.

Surface layer E was formed by the same method as Surface Layer A, except that the thickness was set to 1 µm.

The thickness of the surface layer was adjusted as follows. First, masking was carried out on a PET substrate, and vacuum deposition and sputtering were carried out under the same conditions as indicated above but for varying lengths of time. The film thickness in each case was then measured with an atomic force microscope (AFM), and a calibration curve correlating the resulting times and film thicknesses was prepared. Based on the calibration curve, the vacuum deposition or sputtering time was adjusted to achieve the desired surface layer thickness.

The purity of the surface layer was determined by carrying out a full quantitative analysis with a scanning ESCA microprobe (Quantum 2000; manufactured by Ulvac-Phi, Inc.) while etching in the depth direction with an ion gun, then quantitatively determining the contents of the dissimilar metallic elements by the calibration curve method. As a result, each of the surface layers had substantially the same purity as the purity of the deposition material or the sputtering material.

(2) Mirror-Like Finishing Treatment

Of the above Substrates 1 to 12, Substrates 1 to 6 were subjected to the following mirror-like finishing treatment.

<Mirror-Like Finishing>

In mirror-like finishing, polishing with an abrasive cloth, buffing, then electrolytic polishing were carried out in this order. After buffing, the substrate was rinsed with water.

Polishing with an abrasive cloth was carried out using a polishing platen (Abramin, produced by Marumoto Struers K.K.) and commercial water-resistant abrasive cloths. This polishing operation was carried out while successively changing the grit size of the water-resistant abrasive cloths in the following order: #200, #500, #800, #1000 and #1500.

Buffing was carried out using slurry-type abrasives (FM No. 3 (average particle size, 1 µm) and FM No. 4 (average particle size, 0.3 µm), both made by Fujimi Incorporated).

Electrolytic polishing was carried out for 2 minutes using an electrolytic solution of the composition indicated below (temperature, 70° C.), using the substrate as the anode and a carbon electrode as the cathode, and at a constant current of 130 mA/cm$^2$. The power supply was a GPO110-30R unit manufactured by Takasago, Ltd.

| <Electrolytic Solution Composition> | |
|---|---|
| 85 wt % Phosphoric acid (Wako Pure Chemical Industries, Ltd.) | 660 mL |
| Pure water | 160 mL |
| Sulfuric acid | 150 mL |
| Ethylene glycol | 30 mL |

(3) First Anodizing Treatment

Using the method described below, pits were formed as the starting points for micropore formation on the surfaces of Substrates 1 to 6 which had been mirror-like finished and on the surfaces of Substrates 7 to 12 which had not been mirror-like finished.

Self-ordering anodizing treatment was carried out with the electrolytic solution type and concentration, electrolytic solution flow rate, temperature, voltage, current density and treatment time shown in Table 1, thereby forming anodized layers of the film thicknesses shown in Table 1. In self-ordering anodizing treatment, use was made of NeoCool BD36 (Yamato Scientific Co., Ltd.) as the cooling system, Pairstirrer PS-100 (Tokyo Rikakikai Co., Ltd.) as the stirring and warming unit, and a GP0650-2R unit (Takasago, Ltd.) as the power supply. The flow rate of the electrolytic solution was measured using the vortex flow monitor FLM22-10PCW (manufactured by As One Corporation).

TABLE 1

| Condition | Type of electrolytic solution | Concentration of electrolytic solution (mol/L) | Average flow rate of electrolytic solution (m/min) | Temperature (° C.) | Voltage (V) | Current density (A/dm$^2$) | Treatment time (hr) | Film thickness (µm) |
|---|---|---|---|---|---|---|---|---|
| 1 | phosphoric acid | 0.3 | 18.0 | 7 | 150 | 0.30 | 8.0 | 50 |
| 2 | phosphoric acid | 0.3 | 6.0 | 7 | 150 | 0.30 | 8.0 | 50 |
| 3 | phosphoric acid | 1.0 | 1.0 | 7 | 150 | 0.30 | 8.0 | 50 |
| 4 | phosphoric acid | 1.0 | 0.3 | 7 | 150 | 0.30 | 8.0 | 50 |
| 5 | oxalic acid | 0.3 | 5.0 | 20 | 40 | 2.40 | 1.5 | 40 |
| 6 | oxalic acid | 0.3 | 0.3 | 20 | 40 | 2.40 | 1.5 | 40 |

TABLE 1-continued

| Condition | Type of electrolytic solution | Concentration of electrolytic solution (mol/L) | Average flow rate of electrolytic solution (m/min) | Temperature (° C.) | Voltage (V) | Current density (A/dm$^2$) | Treatment time (hr) | Film thickness (μm) |
|---|---|---|---|---|---|---|---|---|
| 7 | sulfuric acid | 0.3 | 18.0 | 15 | 25 | 2.00 | 7.0 | 140 |
| 8 | sulfuric acid | 0.3 | 6.0 | 15 | 25 | 2.00 | 7.0 | 140 |
| 9 | sulfuric acid | 0.3 | 1.0 | 15 | 25 | 2.00 | 7.0 | 140 |
| 10 | phosphoric acid | 1.0 | 0.3 | 7 | 150 | 0.30 | 0.5 | <1 |

In Table 1, the phosphoric acid, oxalic acid and sulfuric acid used were all reagents available from Kanto Chemical Co., Inc. The current density indicates the value when stable.

Following the above first anodizing treatment, immersion treatment was carried out under the conditions indicated in Table 2 to remove the anodized layer.

TABLE 2

| Condition | 85 wt % Phosphoric acid (g) | Chromic anhydride (g) | Pure water (g) | Temperature (° C.) |
|---|---|---|---|---|
| 51 | 100 | 30 | 1,500 | 30 |
| 52 | 100 | 30 | 1,500 | 50 |
| 53 | 75 | 30 | 1,500 | 50 |
| 54 | 100 | 30 | 1,500 | 70 |
| 55 | 100 | 30 | 1,500 | 90 |
| 56 | 75 | 30 | 1,500 | 90 |

In Table 2, the 85 wt % phosphoric acid and the chromic anhydride used were both reagents available from Kanto Chemical Co., Inc. The treatment solutions used in Conditions 53 and 56 had the compositions specified in JIS H8688 (1998)-H8688.

(4) Second Anodizing Treatment

The substrate in which pits had been formed was subjected to a second anodizing treatment. The second anodizing treatment involved carrying out self-ordering anodizing treatment under the conditions (electrolytic solution type and concentration, electrolytic solution flow rate, temperature, voltage, current density, and treatment time) indicated in Table 3, thereby forming anodized layers of the film thicknesses shown in Table 3. In self-ordering anodizing treatment, use was made of NeoCool BD36 (Yamato Scientific Co., Ltd.) as the cooling system, Pairstirrer PS-100 (Tokyo Rikakikai Co., Ltd.) as the stirring and warming unit, and a GP0650-2R unit (Takasago, Ltd.) as the power supply. The flow rate of the electrolytic solution was measured using the vortex flow monitor FLM22-10PCW (As One Corporation).

TABLE 3

| Condition | Type of electrolytic solution | Concentration of electrolytic solution (mol/L) | Average flow rate of electrolytic solution (m/min) | Temperature (° C.) | Voltage (V) | Current density (A/dm$^2$) | Treatment time (hr) | Film thickness (μm) |
|---|---|---|---|---|---|---|---|---|
| 71 | phosphoric acid | 0.3 | 18.0 | 7 | 150 | 0.30 | 10 | 0.05 |
| 72 | phosphoric acid | 0.3 | 6.0 | 7 | 150 | 0.30 | 100 | 0.50 |
| 73 | phosphoric acid | 1.0 | 1.0 | 7 | 150 | 0.30 | 500 | 2.50 |
| 74 | phosphoric acid | 1.0 | 0.3 | 7 | 150 | 0.30 | 500 | 2.50 |
| 75 | oxalic acid | 0.3 | 5.0 | 20 | 40 | 2.40 | 15 | 0.05 |
| 76 | oxalic acid | 0.3 | 0.3 | 20 | 40 | 2.40 | 150 | 0.50 |
| 77 | sulfuric acid | 0.3 | 18.0 | 15 | 25 | 2.00 | 7 | 0.15 |
| 78 | sulfuric acid | 0.3 | 6.0 | 15 | 25 | 2.00 | 70 | 1.50 |
| 79 | sulfuric acid | 0.3 | 1.0 | 15 | 25 | 2.00 | 70 | 1.50 |
| 80 | sulfuric acid | 1.0 | 0.3 | 15 | 25 | 2.00 | 70 | 1.50 |

(5) Pore Widening Treatment

Pore widening treatment was carried out by immersing the substrate in a treatment solution of the type, concentration and temperature shown in Table 4 for the length of time indicated in Table 6.

TABLE 4

| Condition | Type of treatment solution | Concentration of treatment solution (g/L) | Temperature (° C.) |
|---|---|---|---|
| 91 | phosphoric acid | 50 | 40 |
| 92 | phosphoric acid | 50 | 30 |

Table 6 shows the results for the respective supports obtained by, as mentioned above, subjecting the substrates to the following treatments in the order indicated: mirror-like finishing, first anodizing treatment, second anodizing treatment, pore widening treatment, and aluminum member removing treatment. In Table 6, a dash (-) indicates that the treatment in question was not carried out.

A single-point BET surface area analyzer (FlowSorb III 2310, available from Shimadzu Corporation) was used to measure the specific surface areas of the resulting microstructures. Measurement of the specific surface area was carried out on the side having micropores.

TABLE 5

(units: $m^2/g$)

|  | Specific surface area |
|---|---|
| EX 1 | 215 |
| EX 2 | 222 |
| EX 3 | 219 |
| EX 4 | 220 |
| EX 5 | 214 |
| EX 6 | 232 |
| EX 7 | 209 |
| EX 8 | 272 |
| EX 9 | 238 |
| EX 10 | 267 |
| EX 11 | 267 |
| EX 12 | 267 |
| EX 13 | 267 |
| EX 14 | 267 |
| EX 15 | 267 |
| EX 16 | 226 |
| EX 17 | 221 |
| EX 18 | 219 |
| EX 19 | 217 |
| EX 20 | 215 |
| EX 21 | 218 |
| EX 22 | 210 |

TABLE 5-continued (units: $m^2/g$)

|  | Specific surface area |
|---|---|
| EX 23 | 217 |
| EX 24 | 221 |
| EX 25 | 228 |
| EX 26 | 210 |
| EX 27 | 206 |
| EX 28 | 218 |
| EX 29 | 227 |
| EX 30 | 229 |
| CE 1 | 214 |
| CE 2 | 219 |
| CE 3 | 238 |

(6) Aluminum Member Removing Treatment

Aluminum member removing treatment was carried out by immersing the Example 1 to 30 substrates obtained from above steps (1) to (5) for 30 minutes in bromine having a purity of at least 99.9 wt %, then using methanol-wetted filter paper to filter off as the residue a microstructure composed only of an anodized layer. The residue was then washed with methanol until bromine discoloration was no longer discernible in the filtrate, then washed in turn with 1% hydrochloric acid and water, and dried at 100° C. for 2 minutes, thereby giving the microstructures of Examples 1 to 30.

Aluminum member removing treatment was not carried out on the Comparative Example 1 to 3 substrates obtained from above steps (1) to (5).

(7) Catalyst Supporting Treatment

A platinum catalyst was supported on the microstructures obtained in Examples 1 to 26 and Comparative Examples 1 to 3 by immersing the microstructures in a 30° C. dispersion containing 1 g/L of $HPtCl_4$ and 7 g/L of $H_2SO_4$, and carrying out electrodeposition treatment at a fixed voltage of 11 V (adjusted with an autotransformer such as SLIDAC) for 5 minutes.

A gold catalyst was supported on the microstructures obtained in Examples 27 to 30 as follows. First, 1.5 mL of an aqueous solution containing 1 wt % of citric acid was added to 1.5 mL of an aqueous solution containing 0.05 wt % of $HAuCl_4$. The resulting mixture was gradually heated from room temperature using an alcohol lamp. Heating was discontinued when the solution changed to a red-violet color, after which the solution was cooled to room temperature, yielding a gold colloidal particle dispersion (average size of gold colloidal particles, 120 nm). The support was subsequently immersed in the dispersion for 1 minute, then rinsed with water and dried.

TABLE 6

|  | Substrate | First anodizing treatment condition | Film removal treatment condition | Second anodizing treatment condition | Pore widening treatment | | Supported catalyst |
|---|---|---|---|---|---|---|---|
|  |  |  |  |  | Treatment solution | Treatment time (min) |  |
| EX 1 | 1 | 1 | 53 | 71 | 92 | 15 | Pt |
| EX 2 | 1 | 2 | 53 | 72 | 92 | 15 | Pt |
| EX 3 | 1 | 3 | 53 | 73 | 92 | 15 | Pt |
| EX 4 | 1 | 5 | 53 | 74 | 92 | 15 | Pt |
| EX 5 | 1 | 7 | 53 | 75 | 92 | 15 | Pt |
| EX 6 | 1 | 8 | 53 | 75 | 92 | 15 | Pt |
| EX 7 | 1 | 9 | 53 | 75 | 92 | 15 | Pt |

TABLE 6-continued

| | Substrate | First anodizing treatment condition | Film removal treatment condition | Second anodizing treatment condition | Pore widening treatment Treatment solution | Pore widening treatment Treatment time (min) | Supported catalyst |
|---|---|---|---|---|---|---|---|
| EX 8 | 2 | 1 | 53 | 75 | 92 | 15 | Pt |
| EX 9 | 2 | 2 | 53 | 75 | 92 | 15 | Pt |
| EX 10 | 2 | 3 | 53 | 75 | 92 | 15 | Pt |
| EX 11 | 2 | 5 | 53 | 76 | 92 | 15 | Pt |
| EX 12 | 2 | 7 | 53 | 77 | 92 | 15 | Pt |
| EX 13 | 2 | 8 | 53 | 78 | 92 | 15 | Pt |
| EX 14 | 2 | 9 | 53 | 79 | 92 | 15 | Pt |
| EX 15 | 3 | 1 | 53 | 80 | 92 | 15 | Pt |
| EX 16 | 3 | 2 | 53 | 71 | 92 | 15 | Pt |
| EX 17 | 3 | 3 | 53 | 72 | 92 | 15 | Pt |
| EX 18 | 3 | 5 | 53 | 73 | 92 | 15 | Pt |
| EX 19 | 3 | 7 | 53 | 74 | 92 | 15 | Pt |
| EX 20 | 3 | 8 | 53 | 75 | 92 | 15 | Pt |
| EX 21 | 3 | 9 | 53 | 75 | 92 | 15 | Pt |
| EX 22 | 4 | 1 | 51 | 75 | 91 | 15 | Pt |
| EX 23 | 5 | 2 | 51 | 75 | 91 | 15 | Pt |
| EX 24 | 6 | 3 | 52 | 75 | 91 | 15 | Pt |
| EX 25 | 7 | 5 | 52 | 75 | 91 | 15 | Pt |
| EX 26 | 8 | 7 | 54 | 76 | 92 | 15 | Pt |
| EX 27 | 9 | 8 | 54 | 77 | 92 | 15 | Au |
| EX 28 | 10 | 9 | 55 | 78 | 92 | 15 | Au |
| EX 29 | 11 | 10 | 55 | 79 | — | — | Au |
| EX 30 | 12 | 10 | 56 | 80 | — | — | Au |
| CE 1 | 1 | 1 | 53 | 71 | 92 | 15 | Pt |
| CE 2 | 1 | 5 | 53 | 75 | 92 | 15 | Pt |
| CE 3 | 2 | 10 | 53 | 75 | 92 | 15 | Pt |

2. Evaluation of Microstructures

To check the heat resistances of the microstructures obtained as described above, the microstructures were placed in an oven set to 500° C. and left there for one hour. The microstructures were then visually examined for cracks or crazing. Microstructures in which cracks or crazing were not observed were rated as "good," and those in which cracks or crazing were noted were rated as "NG." The results are shown in Table 7.

To check the catalytic function, 10 moles of cyclohexane was blown onto the microstructure as a mist in a 375° C., 1 atmosphere environment, following which the volatilized components were liquefied by cooling and recovered, and the conversion (%) of cyclohexane to cyclohexene, cyclohexadiene or benzene was determined by liquid chromatography. A higher conversion indicates higher catalytic function. The results are shown in Table 7.

The degree of ordering of the pores in the microstructure was measured using surface images obtained by FE-SEM. About 200 to 400 micropores were measured by the method shown in FIGS. 1A and 1B. Each of the results shown in Table 7 is the average for n=10 measurements.

TABLE 7

| | Heat resistance | Conversion (%) | Average degree of ordering, (n = 10) (%) |
|---|---|---|---|
| Example 1 | good | 85 | 95 |
| Example 2 | good | 85 | 90 |
| Example 3 | good | 86 | 90 |
| Example 4 | good | 85 | 82 |
| Example 5 | good | 87 | 91 |
| Example 6 | good | 85 | 88 |
| Example 7 | good | 86 | 87 |
| Example 8 | good | 87 | 71 |
| Example 9 | good | 90 | 75 |
| Example 10 | good | 89 | 70 |
| Example 11 | good | 87 | 72 |
| Example 12 | good | 85 | 75 |
| Example 13 | good | 87 | 72 |
| Example 14 | good | 85 | 68 |
| Example 15 | good | 87 | 71 |
| Example 16 | good | 87 | 74 |
| Example 17 | good | 86 | 72 |
| Example 18 | good | 85 | 67 |
| Example 19 | good | 87 | 76 |
| Example 20 | good | 88 | 62 |
| Example 21 | good | 85 | 69 |
| Example 22 | good | 87 | 64 |
| Example 23 | good | 88 | 57 |
| Example 24 | good | 89 | 81 |
| Example 25 | good | 91 | 52 |
| Example 26 | good | 87 | 81 |
| Example 27 | good | 85 | 88 |
| Example 28 | good | 87 | 84 |
| Example 29 | good | 85 | 40 |
| Example 30 | good | 87 | 45 |
| Comparative Example 1 | NG | 87 | 78 |
| Comparative Example 2 | NG | 89 | 75 |
| Comparative Example 3 | NG | 86 | 40 |

It is apparent from Table 7 that the microstructures of the invention have an excellent heat resistance.

What is claimed is:

1. A method of manufacturing a microstructure composed of an anodized layer having on a surface thereof catalyst-supporting micropores, comprising the steps of:
   - forming a pit that serves as a starting point for a formation of the micropores;
   - anodizing an aluminum member to form on its surface an anodized aluminum layer having the micropores on a surface thereof;
   - removing the aluminum member so as to leave only the anodized aluminum layer; and
   - supporting a catalyst on at least part of the anodized aluminum layer.

2. The method of manufacturing the microstructure according to claim 1, wherein a degree of ordering of the micropores is at least 40%.

3. The method of manufacturing the microstructure according to claim 2, wherein said supported catalyst is at least one selected from the group consisting of Pt and Au.

4. The method of manufacturing a microstructure, according to claim 1 wherein the step of forming a pit comprises the steps of,
   - a first anodizing an aluminum member to form on its surface an anodized aluminum layer having micropores on a surface thereof and
   - removing the first anodized film;
   - and wherein the step of anodizing an aluminum member to form on its surface an anodizing aluminum layer having micropores on a surface thereof is a second anodizing step.

* * * * *